United States Patent
Jian et al.

(10) Patent No.: US 8,526,384 B2
(45) Date of Patent: Sep. 3, 2013

(54) METHOD OF TRANSMITTING AND RECEIVING CHANNEL STATE INFORMATION FEEDBACK IN A WIRELESS COMMUNICATION SYSTEM

(75) Inventors: Xu Jian, Anyang-si (KR); Ja Ho Koo, Anyang-si (KR); Bin Chul Ihm, Anyang-si (KR); Moon Il Lee, Anyang-si (KR); Wook Bong Lee, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 166 days.

(21) Appl. No.: 13/143,813

(22) PCT Filed: Dec. 2, 2009

(86) PCT No.: PCT/KR2009/007145
§ 371 (c)(1),
(2), (4) Date: Jul. 8, 2011

(87) PCT Pub. No.: WO2010/128744
PCT Pub. Date: Nov. 11, 2010

(65) Prior Publication Data
US 2011/0268073 A1    Nov. 3, 2011

Related U.S. Application Data

(60) Provisional application No. 61/175,800, filed on May 6, 2009, provisional application No. 61/180,896, filed on May 25, 2009.

(51) Int. Cl.
*H04W 4/00* (2009.01)

(52) U.S. Cl.
USPC .......................................................... 370/329

(58) Field of Classification Search
None
See application file for complete search history.

(56) References Cited

U.S. PATENT DOCUMENTS

| | | |
|---|---|---|
| 2005/0043031 A1 | 2/2005 | Cho et al. |
| 2007/0086400 A1* | 4/2007 | Shida et al. ................... 370/338 |
| 2009/0036150 A1* | 2/2009 | Liao et al. ..................... 455/501 |
| 2009/0068953 A1* | 3/2009 | Lee et al. ..................... 455/63.1 |
| 2011/0106952 A1* | 5/2011 | Doppler et al. ............... 709/226 |

FOREIGN PATENT DOCUMENTS

| | | |
|---|---|---|
| KR | 2005-0020576 | 3/2005 |
| WO | 03/084092 | 10/2003 |
| WO | 2004/039011 | 5/2004 |

OTHER PUBLICATIONS

International Search Report for PCT/KR2009/007145.

* cited by examiner

*Primary Examiner* — John Blanton
(74) *Attorney, Agent, or Firm* — Morgan, Lewis & Bockius LLP

(57) ABSTRACT

A method of transmitting and receiving channel state information feedback in a wireless communication system is disclosed. A method of transmitting channel state information (CSI) feedback by a user equipment receiver in a wireless communication system comprises mapping components of a CSI matrix to constellations; and allocating the mapped components to resource.

12 Claims, 5 Drawing Sheets

METHOD OF TRANSMITTING AND RECEIVING CHANNEL STATE INFORMATION FEEDBACK IN A WIRELESS COMMUNICATION SYSTEM

The present application is a national stage of PCT International Application No. PCT/KR2009/007145 filed Dec. 2, 2009, and claims the benefit of U.S. Provisional Application Nos. 61/175,800, filed May 6, 2009 and 61/180,896, filed May 25, 2009.

TECHNICAL FIELD

The present invention relates to a wireless communication system, and more particularly to a method of transmitting and receiving channel state information feedback in a wireless communication system.

BACKGROUND ART

In the 4th Generation wireless communication systems, MIMO schemes play a fundamental role in order to achieve high data rates in the downlink.

Multi-Input Multi-Output (MIMO) technology improves efficiency of data transmission and receipt using a multiple transmit antenna and a multiple receive antenna.

While a receiver receives data through a single path if a single antenna is used, a receiver receives data through multiple paths if a multiple antenna is used. Thus, speed and capacity of data transmission is improved and coverage is enlarged.

Generally, there are an open-loop MIMO system in which a transmitter doesn't use feedback information from a receiver and a closed-loop MIMO system in which a transmitter uses feedback information from a receiver in multiple antenna systems. In a closed-loop multiple antenna system, a receiver transmits channel state information or channel state indication (CSI) to a transmitter and the transmitter detects channel status through it so that performance of a communication system is improved.

Implicit recommended transmission properties (e.g. CQI/PMI/RI) feedback and explicit CSI feedback are two representative feedback schemes, in which CSI feedback is categorized into quantization CSI feedback and analogue CSI feedback. Channel matrix H or covariance matrix R could be the feedback information in the CSI case. For more efficient transmission, noise variance (e.g. interference level) is transmitted to a transmitter together with channel matrix H or covariance matrix R.

In a method of transmitting and receiving of CSI feedback according to the related art, a receiver transmits analogue values of channel matrix H or covariance matrix R. Thus, the Peak-to-Average Power Ratio (PAPR) is increased.

DISCLOSURE OF INVENTION

Technical Problem

As previously stated above, the related art has a problem that the PAPR is increased.

An object of the present invention is to provide a method of transmitting and receiving of CSI feedback, which can reduce the PAPR.

Technical subject matters to be realized by embodiments of the present invention are not limited to the above-mentioned technical subject matters, and other technical subject matters not mentioned in the above-mentioned description may be easily appreciated by those skilled in the art to which the present invention pertains without difficulty.

Technical Solution

In order to solve the above technical problems, a method of transmitting channel state information (CSI) feedback by an user equipment (UE) receiver in a wireless communication system comprises mapping components of a CSI matrix to constellations; and allocating the mapped components to resource.

Also, the mapping comprises the mapping components of a CSI matrix to constellations using 16 QAM (quadrature amplitude modulation).

Also, the mapping comprises the mapping components of a CSI matrix to constellations using PSK (phase shift keying).

Also, the PSK is different from PSK used in previous subframe.

Also, the CSI matrix is a channel covariance matrix.

Also, the resource is a RB (resource block).

Also, the allocating comprises allocating the components to frequency domain of the resource first.

Also, the allocating comprises allocating the components to time domain of the resource first.

In order to solve the above technical problems, a method of receiving channel state information (CSI) feedback by a base station in a wireless communication system comprises transmitting a signal to a receiver; and receiving CSI matrix whose components are mapped to constellations.

Also, the components are mapped to constellations using 16 QAM (quadrature amplitude modulation).

Also, the components are mapped to constellations using PSK (phase shift keying).

Advantageous Effects

According to the embodiments of the present invention, since components of a CSI matrix are mapped to constellations, the PAPR is reduced.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
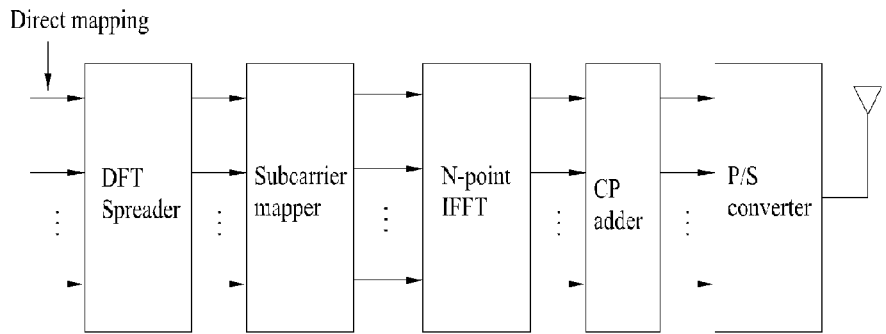
FIG. 1 illustrates the structure of an apparatus of transmitting channel state information feedback in a SC-FDMA (Single-carrier frequency-division multiple access) system according to first embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings. For convenience of description and better understanding of the present invention, some parts unrelated to the inventive concept of the present invention will be omitted herein. Wherever possible, the same reference numbers will be used throughout the drawings to refer to the same or like parts.

In the whole part of the specification of the present invention, if it is assumed that a certain part includes a certain component, the term 'including' means that a corresponding component may further include other components unless a specific meaning opposed to the corresponding component is written. In addition, another term ' . . . part', " . . . unit', 'module' or the like means a unit for processing at least one function or operation, and this unit may be implemented by hardware, software, or a combination thereof.

A UE receiver can transmit Channel matrix or covariance matrix as feedback information in explicit CSI feedback.

First, channel matrix, channel covariance matrix and normalization of analogue CSI feedback will be described.

Channel matrix is as equation 1.

$$H(i,k) = \begin{bmatrix} h_{1,1}(i,k) & h_{1,2}(i,k) & \ldots & h_{1,Nt}(i,k) \\ h_{2,1}(i,k) & h_{2,2}(i,k) & \ldots & h_{2,Nt}(i,k) \\ \vdots & \vdots & \ddots & \vdots \\ h_{Nr,1}(i,k) & h_{Nr,2}(i,k) & \ldots & h_{Nr,Nt}(i,k) \end{bmatrix} \quad \text{[Equation 1]}$$

where H(i,k) denotes channel matrix, and hr,t(i,k) is a element of channel matrix H(i,k) which means a channel state of rth receiver antenna and tth transmitter antenna on ith symbol and kth subcarrier. Nr sis the number of receiver antennas and Nt is the number of transmitter antennas. r is the index of receiver antenna, t is the index of transmitter antenna, i is the index of OFDM (or SC-FDMA) symbol and k is the index of subcarrier.

Channel covariance matrix is as equation 2.

$$R=E[H(i,k)^H H(i,k)] \quad \text{[Equation 2]}$$

Where R is channel covariance matrix, and E[ ] is mean.

In order to reduce the PAPR, the values of the channel matrix, channel covariance matrix and noise variance can be normalized. In the case of Analogue CSI feedback, channel matrix, channel covariance matrix and noise variance can be normalized by the total power sum of uplink symbol. For instance, when M=3, i.e., each UE is allocated 3 best subbands, each channel covariance matrix and each noise variance ($\sigma^2$) for each subband are normalized by the value of total power sum of uplink symbols ($\eta$) or the maximum symbol power ($\theta'$) among all the symbols, as shown in Equation 3.

$$\hat{R}(1) = \frac{R(1)}{\eta}, \hat{R}(2) = \frac{R(2)}{\eta}, \hat{R}(3) = \frac{R(3)}{\eta},$$

$$\hat{\sigma}^2(1) = \frac{\sigma^2(1)}{\eta}, \hat{\sigma}^2(2) = \frac{\sigma^2(2)}{\eta}, \hat{\sigma}^2(3) = \frac{\sigma^2(3)}{\eta} \quad \text{[Equation 3]}$$

Based on the normalization of channel covariance matrix above, the channel capacity of the best subband m (m=1, 2, . . . , M) is calculated as given in Equation 4. With the information of rank and precoding matrix, modulation and coding scheme (MCS) can be obtained at the transmitter.

$$R(m) = \hat{R}(m) \times \mu,$$

$$\sigma^2(m) = \hat{\sigma}^2(m) \times \mu,$$

$$C(m) = \text{logdet}\left(I + \frac{1}{\sigma^2(m)} R(m)\right)$$

$$= \text{logdet}\left(I + \frac{1}{\hat{\sigma}^2(m) \times \mu} \mu \times \hat{R}(m)\right)$$

$$= \text{logdet}\left(I + \frac{1}{\hat{\sigma}^2(m)} \hat{R}(m)\right) \quad \text{[Equation 4]}$$

Next, a method of a method of transmitting and receiving channel state information feedback according to first embodiment of the present invention will be described with reference to FIG. 1 to 5.

Figure 2:
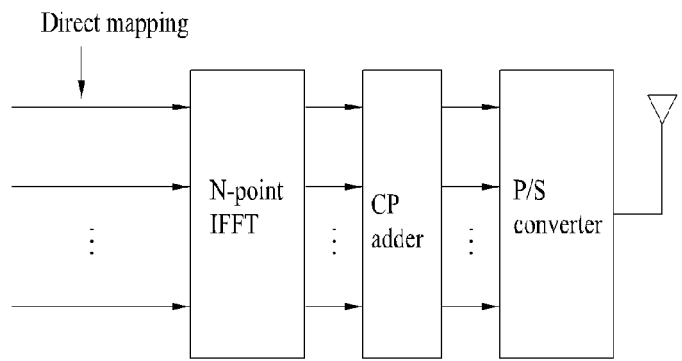
FIG. 2 illustrates the structure of an apparatus of transmitting channel state information feedback in an OFDMA (Orthogonal frequency-division multiple access) system according to first embodiment of the present invention.

FIG. 1 illustrates the structure of an apparatus of transmitting channel state information feedback in a SC-FDMA (Single-carrier frequency-division multiple access) system according to first embodiment of the present invention. FIG. 2 illustrates the structure of an apparatus of transmitting channel state information feedback in an OFDMA (Orthogonal frequency-division multiple access) system according to first embodiment of the present invention.

As illustrated in FIG. 1, an apparatus of transmitting CSI feedback in a SC-FDMA system comprises DFT spreader 110, subcarrier mapper 120, N-point IFFT (inverse fast fourier transformer) 130, CP (cyclic prefix) adder 140 and P/S converter (parallel to serial converter) 150.

According to first embodiment of the present invention, the normalized components of CSI matrix are mapped directly to the DFT spreader 110.

For example, it is assumed that there are 4 antennas in a base station. Thus, channel covariance matrix is 4*4 and can be expressed in Equation 5.

$$R(i,k) = \begin{bmatrix} r_{1,1}(i,k) & r_{1,2}(i,k) & r_{1,3}(i,k) & r_{1,4}(i,k) \\ r_{2,1}(i,k) & r_{2,2}(i,k) & r_{2,3}(i,k) & r_{2,4}(i,k) \\ r_{3,1}(i,k) & r_{3,2}(i,k) & r_{3,3}(i,k) & r_{3,4}(i,k) \\ r_{4,1}(i,k) & r_{4,2}(i,k) & r_{4,3}(i,k) & r_{4,4}(i,k) \end{bmatrix}$$ [Equation 5]

The channel covariance matrix is a symmetric matrix based on the diagonal term. Therefore it is enough to transmit only the diagonal term and upper triangle values. That is, 10 components of the 4*4 matrix shown in Equation 5 are transmitted as CSI feedback.

The subcarrier mapper 120 maps the normalized components of CSI matrix to uplink resource. The uplink resource can be RBs (resource blocks) of PUSCH (Physical Uplink Shared Channel) in LTE system. For example, the channel covariance matrix in Equation 5 can be allocated in 1 RB of PUSCH.

FIGS. 3 to 6 illustrate resource mapping schemes.

Figure 3:
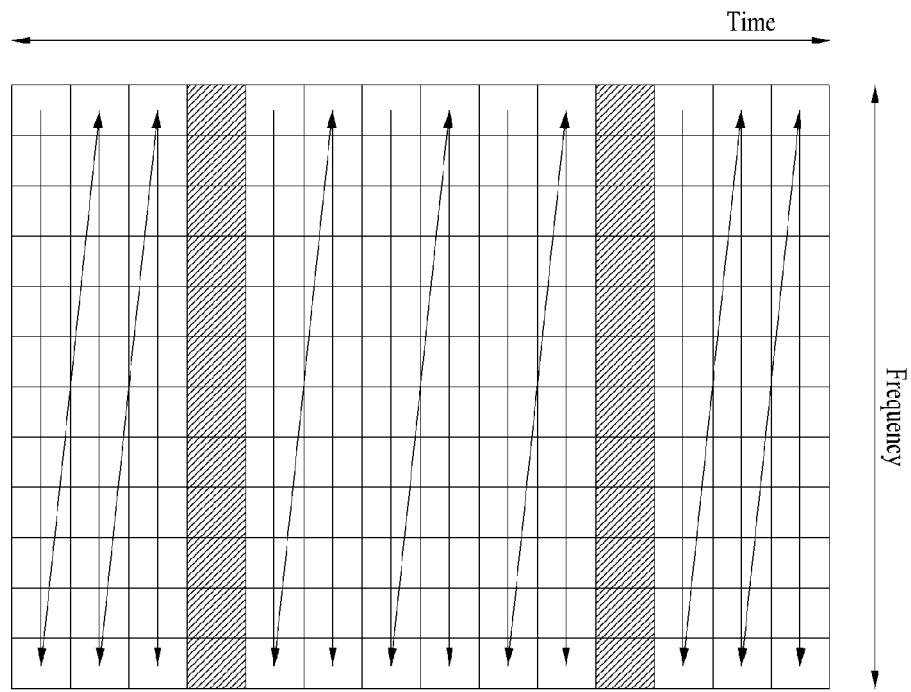
FIG. 3 illustrates a resource full mapping scheme which is frequency domain first mapping.
Figure 4:
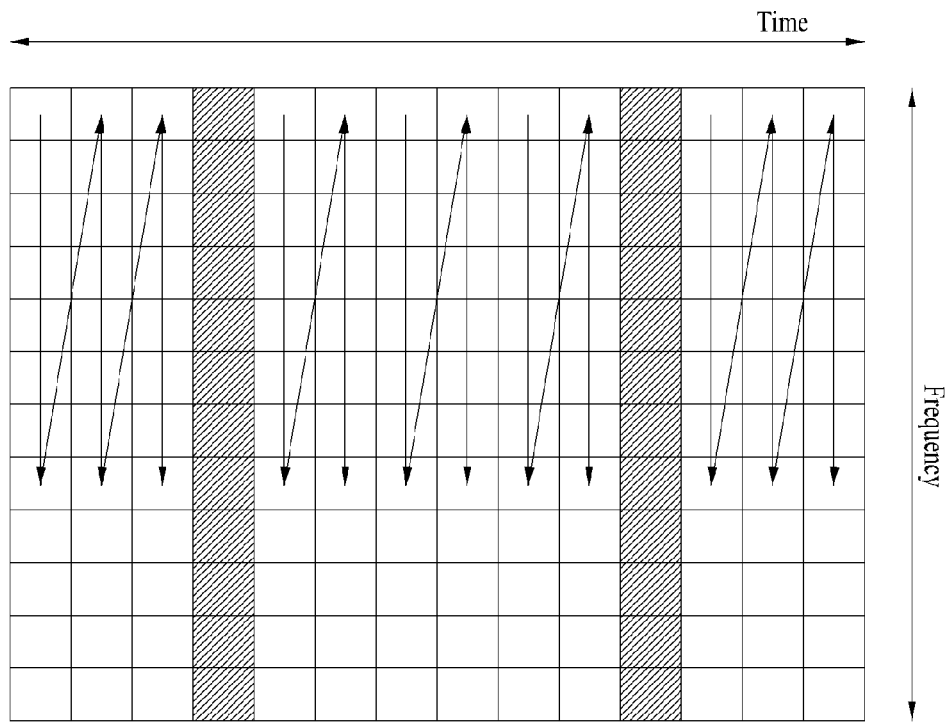
FIG. 4 illustrates a resource partial mapping scheme which is frequency domain first mapping.
Figure 5:
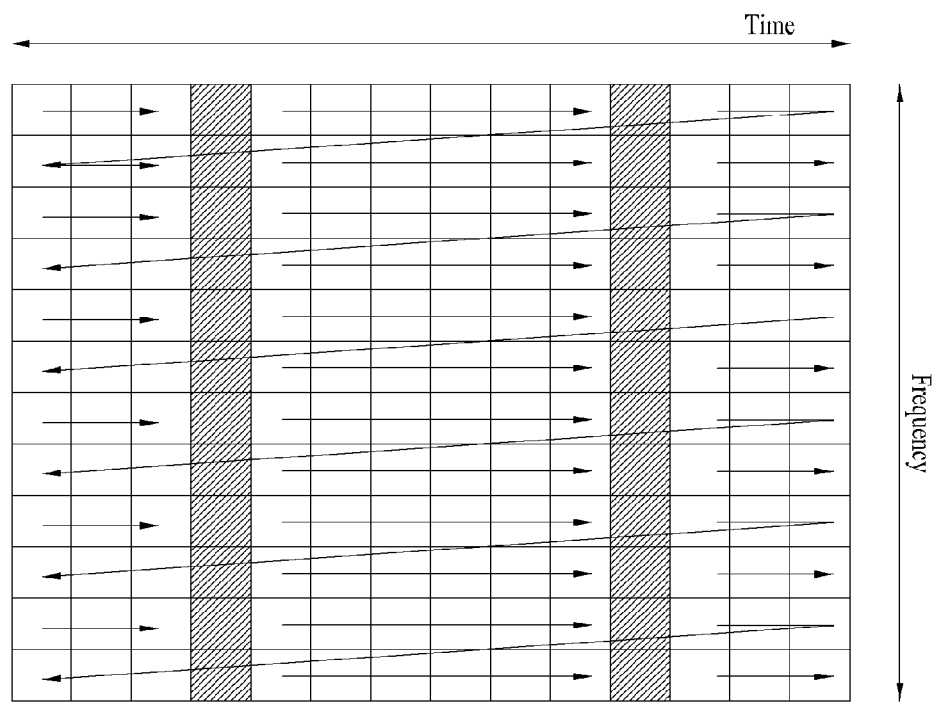
FIG. 5 illustrates a resource full mapping scheme which is time domain first mapping.
Figure 6:
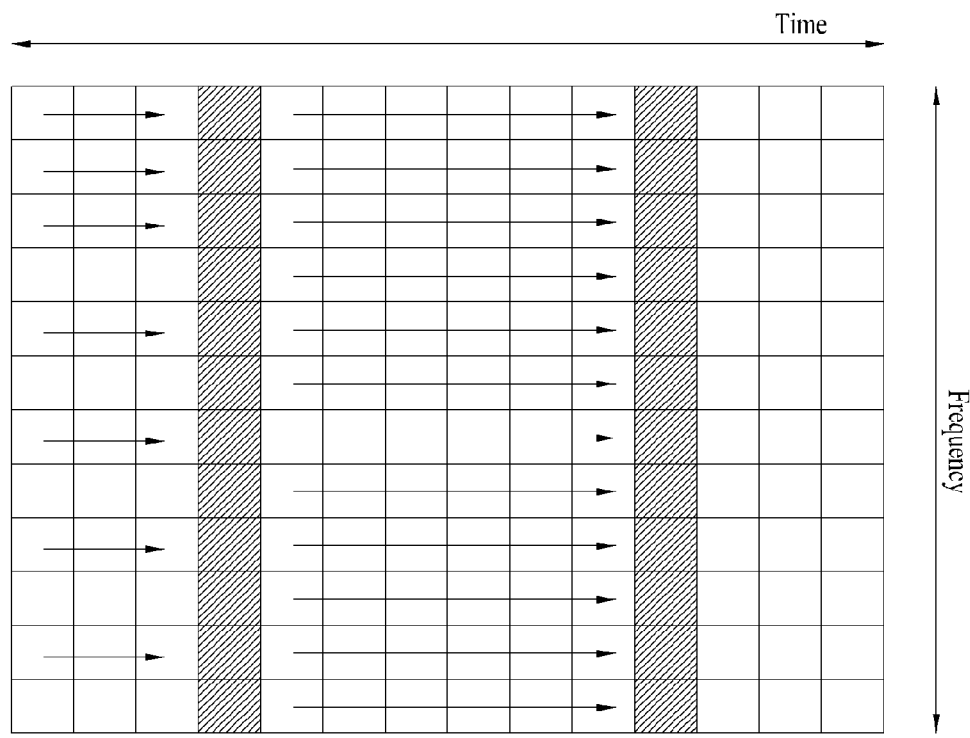
FIG. 6 illustrates a resource partial mapping scheme which is time domain first mapping.

FIG. 3 illustrates a resource full mapping scheme which is frequency domain first mapping. FIG. 4 illustrates a resource partial mapping scheme which is frequency domain first mapping. FIG. 5 illustrates a resource full mapping scheme which is time domain first mapping. FIG. 6 illustrates a resource partial mapping scheme which is time domain first mapping.

N-point IFFT 130 performs IFFT (inverse fast fourier transform) to the signal mapped to the resource. Signal in frequency domain is transformed to signal in time domain by the IFFT.

CP adder 140 adds cyclic prefix (CP) to the signal. And P/S converter 150 converts the parallel signal into serial signal. Then, a receiver transmits the serial signal to a transmitter.

As illustrated in FIG. 2, an apparatus of transmitting CSI feedback in an OFDMA system comprises N-point IFFT 210, CP adder 220 and P/S converter 230.

In an OFDM system, the normalized components of CSI matrix are mapped to uplink resource. The uplink resource can be RBs of PUSCH in LTE system. For example, the channel covariance matrix in Equation 5 can be allocated in 1 RB of PUSCH. The normalized components of CSI matrix are mapped to uplink resource as mapping schemes illustrated in FIGS. 3 to 6.

Then, the normalized components of CSI matrix are mapped directly to the N-point IFFT 210.

CP adder 220 adds cyclic prefix (CP) to the signal. And P/S converter 230 converts the parallel signal into serial signal. Then, a receiver transmits the serial signal to a transmitter.

According to first embodiment of the present invention, the PAPR problem still exists since the components of CSI matrix R may differ a lot.

Next, a method of transmitting and receiving CSI feedback according to second embodiment of the present invention will be described with reference to FIG. 7 to 9.

Figure 7:
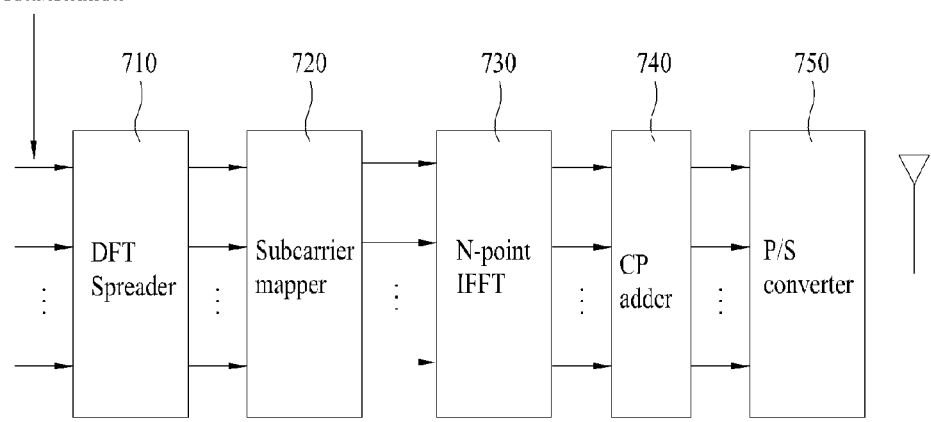
FIG. 7 illustrates the structure of an apparatus of transmitting CSI feedback in a SC-FDMA system according to second embodiment of the present invention.

FIG. 7 illustrates the structure of an apparatus of transmitting CSI feedback in a SC-FDMA system according to second embodiment of the present invention. FIG. 8 illustrates the structure of an apparatus of transmitting CSI feedback in an OFDMA system according to second embodiment of the present invention.

Figure 8:
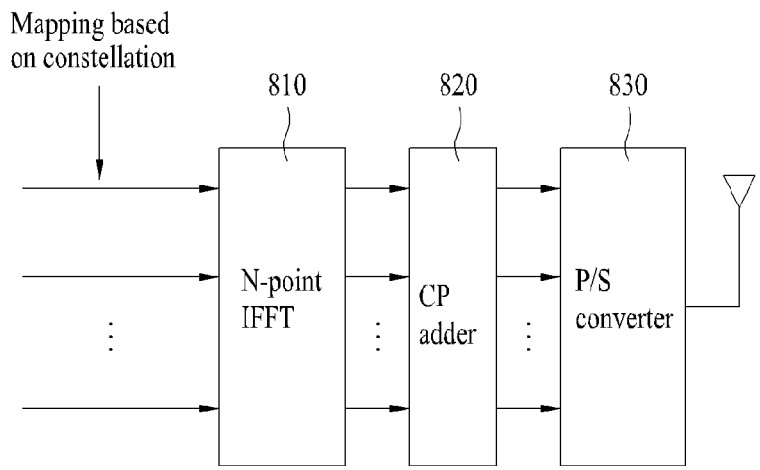
FIG. 8 illustrates the structure of an apparatus of transmitting CSI feedback in an OFDMA system according to second embodiment of the present invention.

As illustrated in FIGS. 7 and 8, normalized components of CSI matrix are mapped to the modulation constellations first. The mapping is based on the closest point in the constellation.

Any constellation can be utilized in second embodiment of the present invention. FIG. 9 illustrates an example of constellation based mapping. FIG. 9 shows 16 QAM (quadrature amplitude modulation).

Figure 9:
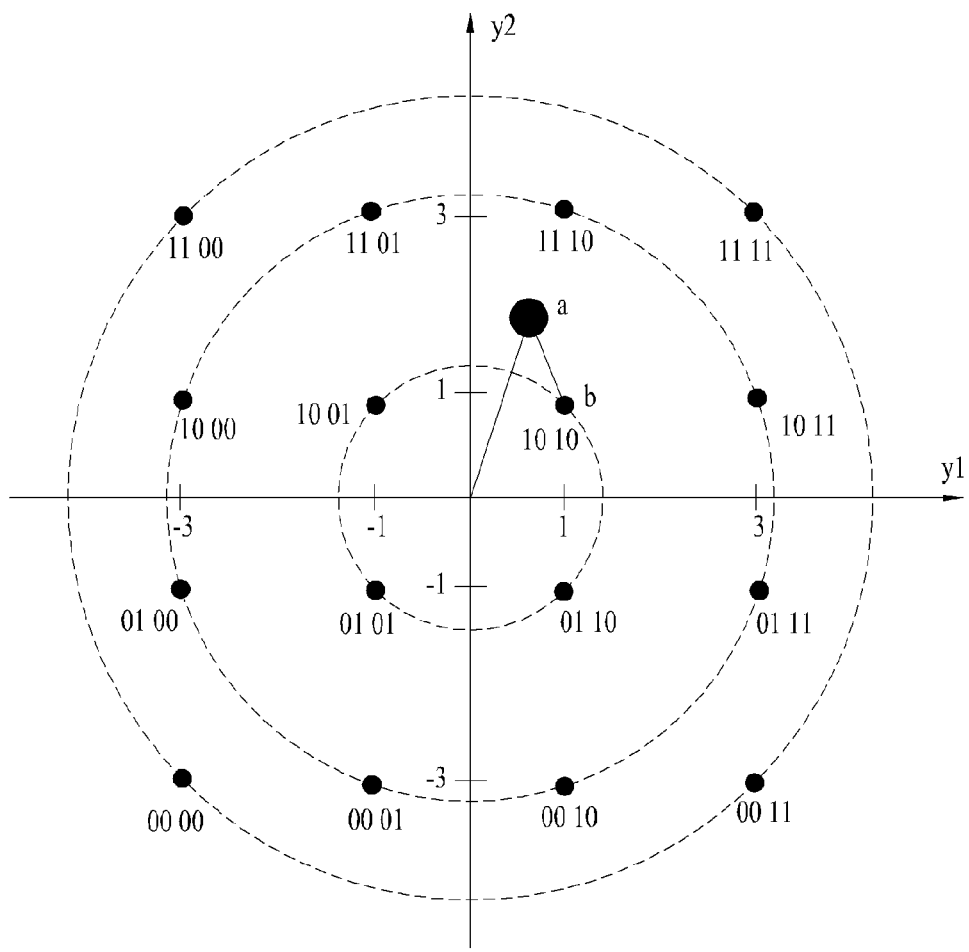
FIG. 9 illustrates an example of QAM constellation based mapping.

In FIG. 9, point 'a' is one of complex components of CSI matrix, the closest point in the 16 QAM constellation will be selected as the mapped point. It can be seen that 'b' is the selected one in this example. Then, the PAPR is reduced since the difference between the points is limited by 16QAM.

As illustrated in FIG. 7, an apparatus of transmitting CSI feedback in a SC-FDMA system comprises DFT spreader 710, subcarrier mapper 720, N-point IFFT (inverse fast fourier transformer) 730, CP (cyclic prefix) adder 740 and P/S converter (parallel to serial converter) 750.

In a SC-FDMA system, the mapped components of CSI matrix are mapped to the DFT spreader 710.

Then, the subcarrier mapper 720 allocates the mapped components of CSI matrix based on constellation to uplink resource. The uplink resource can be RBs of PUSCH in LTE system. For example, components of a channel covariance matrix can be allocated in 1 RB of PUSCH. The mapped components of CSI matrix are allocated in uplink resource as mapping schemes illustrated in FIGS. 3 to 6.

N-point IFFT 730 performs IFFT (inverse fast fourier transform) to the signal mapped to the resource. Signal in frequency domain is transformed to signal in time domain by the IFFT.

CP adder 740 adds cyclic prefix (CP) to the signal. And P/S converter 750 converts the parallel signal into serial signal. Then, a receiver transmits the serial signal to a transmitter.

As illustrated in FIG. 8, an apparatus of transmitting CSI feedback in an OFDMA system comprises N-point IFFT 810, CP adder 820 and P/S converter 830.

In an OFDM system, the mapped components of CSI matrix are allocated to uplink resource. The uplink resource can be RBs of PUSCH in LTE system. For example, components of a channel covariance matrix can be allocated in 1 RB of PUSCH. The mapped components of CSI matrix are allocated in uplink resource as mapping schemes illustrated in FIGS. 3 to 6.

Then, the allocated components of CSI matrix are mapped to the N-point IFFT 810.

CP adder 820 adds cyclic prefix (CP) to the signal. And P/S converter 830 converts the parallel signal into serial signal. Then, a receiver transmits the serial signal to a transmitter.

Next, a method of a method of transmitting and receiving CSI feedback according to third embodiment of the present invention will be described with reference to FIG. 10 to 11.

According to third embodiment of the present invention, normalized components of CSI matrix are mapped to the modulation constellations first. In third embodiment of the present invention, PSK (phase shift keying) constellation is utilized.

Suppose there are n bits to express the complex value of components of CSI matrix. Without loss of generality, if m bits are used to express the amplitude, there are $2^m$ levels to quantize the amplitude of components. The remaining (n-m) bits are utilized for the phase, so $2^{n-m}$ levels are obtained to quantize the phase. Finally the n bits PSK is formed.

Figure 10:
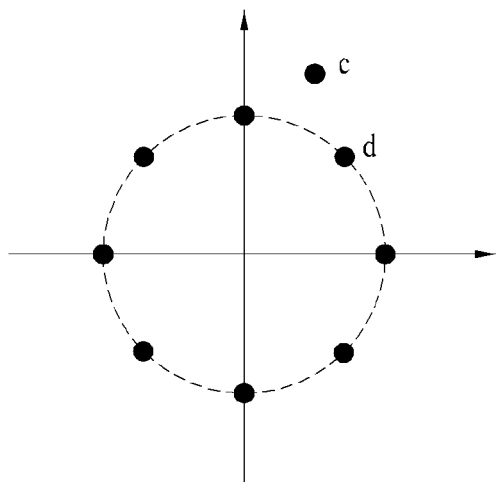
FIG. 10 illustrates an example of PSK mapping.
Figure 11:
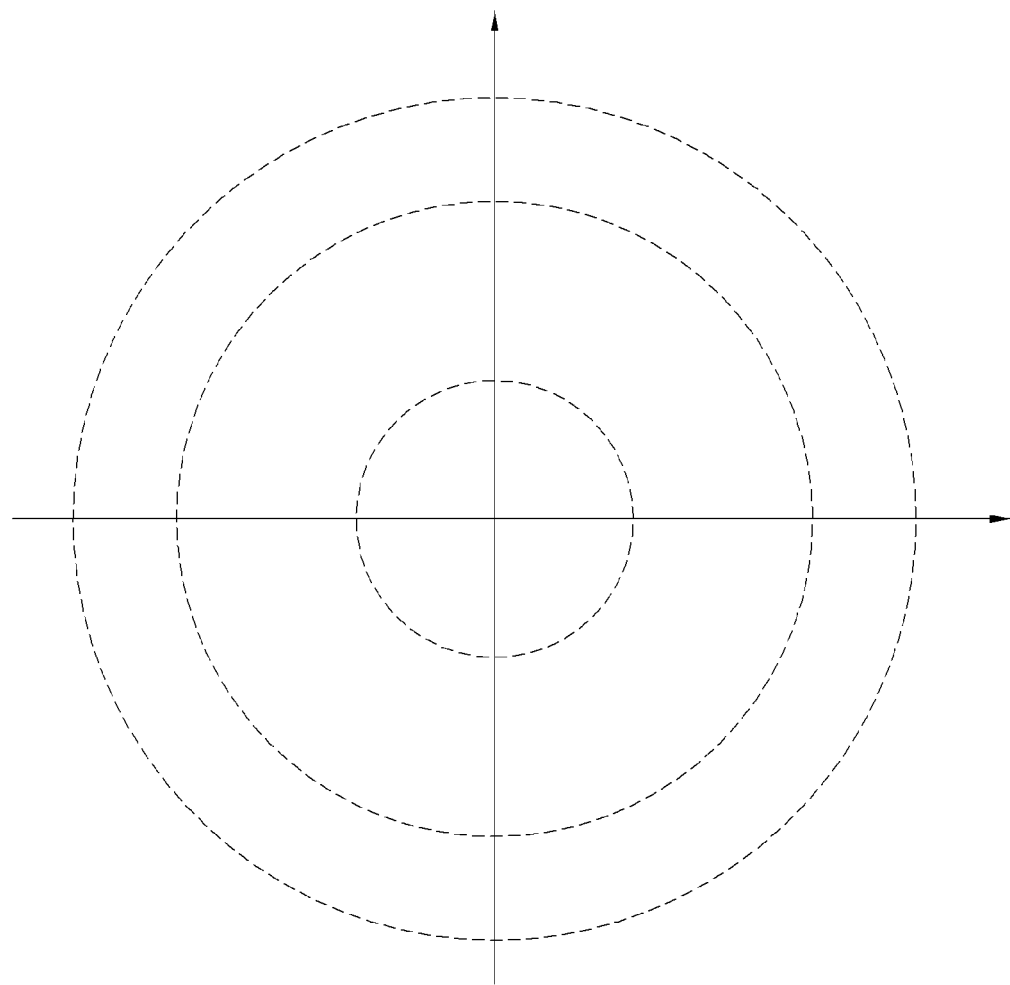
FIG. 11 illustrates another example of PSK mapping

FIG. 10 illustrates an example of PSK mapping and FIG. 11 illustrates another example of PSK mapping In FIG. 10, 3 bits are predefined to express the complex values according to the channel condition of UE. Thus 8PSK is used. Suppose point c ($r \cdot e^{j\theta}$) is one of components of the CSI matrix. After r and θ are quantized, d or any other points of the 8PSK constellation could be the mapped candidates in this example depending on the specific mapping rules.

One fixed PSK is used for UE feedback mapping during some time such as time slot or subframe. Moreover PSK may vary, which means the number of bits n to quantize the amplitude and phase may vary, in the next subframe or for different UEs according to the uplink channel status. As illustrated in FIG. 11, amplitude of PSK may vary.

According to third embodiment of the present invention, the PAPR is reduced since the difference between the points is limited by PSK.

In a SC-FDMA system, the mapped components of CSI matrix are mapped to the DFT spreader.

Then, the mapped components of CSI matrix based on constellation are allocated to uplink resource. The uplink resource can be RBs of PUSCH in LTE system. For example, components of a channel covariance matrix can be allocated in 1 RB of PUSCH. The mapped components of CSI matrix are allocated in uplink resource as mapping schemes illustrated in FIGS. 3 to 6.

In a SC-FDMA system, the allocated signal is inverse fast fourier transformed and added CP and converted into serial signal. Then, a receiver transmits the serial signal to a transmitter.

In an OFDM system, the mapped components of CSI matrix are allocated to uplink resource. The uplink resource can be RBs of PUSCH in LTE system. For example, components of a channel covariance matrix can be allocated in 1 RB of PUSCH. The mapped components of CSI matrix are allocated in uplink resource as mapping schemes illustrated in FIGS. 3 to 6.

Then, the allocated components of CSI matrix are inverse fast fourier transformed and added CP and converted into serial signal. Then, a receiver transmits the serial signal to a transmitter.

In second and third embodiment of the present invention, there exists one problem when the components of channel covariance matrix are mapped to constellations. The diagonal terms are not complex values but rather real ones. The following scheme can solve this problem. As shown in Equation 6, two of the diagonal terms form one complex value, which can map the points in the constellation.

$$\{r_{1,1}+jr_{2,2}, r_{1,1}+jr_{2,2}, \ldots, r_{N-1,N-1}+jr_{N,N}\}$$ [Equation 6]

Where $r_{i,i}$ (1–i–N) are diagonal terms of channel covariance matrix. Then, the use of RE (resource element) in the PUSCH RB can be reduced.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit may be located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are contained in the scope of the present invention.

It is apparent that the present invention may be embodied by a combination of claims which do not have an explicit cited relation in the appended claims or may include new claims by amendment after application.

The invention claimed is:

1. A method of transmitting channel state information (CSI) feedback by a receiver to a transmitter in a wireless communication system, the method comprising:
    mapping upper triangle components $r_{x,y}(i,k)$ of a channel covariance matrix $R(i,k)$, where $x \leq y$, to constellation points;
    allocating the mapped upper triangle components to a resource; and
    transmitting the mapped upper triangle components as the CSI feedback using the allocated resource,
    wherein $$R(i,k) = \begin{bmatrix} r_{1,1}(i,k) & r_{1,2}(i,k) & \ldots & r_{1,N}(i,k) \\ r_{2,1}(i,k) & r_{2,2}(i,k) & \ldots & r_{2,N}(i,k) \\ \vdots & \vdots & \ddots & \vdots \\ r_{N,1}(i,k) & r_{N,2}(i,k) & \ldots & r_{N,N}(i,k) \end{bmatrix},$$

where N is a number of antennas at the transmitter, i is a symbol index, and k is a subcarrier index.

2. The method according to claim 1, wherein the constellation points are points of a 16 QAM (quadrature amplitude modulation) constellation.

3. The method according to claim 1, wherein the constellation points are points of a PSK (phase shift keying) constellation.

4. The method according to claim 3, wherein the PSK is different from PSK used in previous subframe.

5. The method according to claim 1, wherein the resource is a RB (resource block).

6. The method according to claim 1, wherein the allocating comprises allocating the upper triangle components to a frequency domain of the resource first.

7. The method according to claim 1, wherein the allocating comprises allocating the upper triangle components to a time domain of the resource first.

8. The method according to claim 1, wherein the mapping maps each pair of two diagonal components $r_{x,y}(i,k)$, where x=y, to one constellation point by using one of the two diagonal components as a real part of a complex value and the other one of the two diagonal components as an imaginary part of the complex value.

9. A method of receiving channel state information (CSI) feedback by a transmitter in a wireless communication system, the method comprising:
    transmitting a signal to a receiver; and
    receiving the CSI feedback indicating a channel covariance matrix $R(i,k)$ from the receiver,
    wherein $$R(i,k) = \begin{bmatrix} r_{1,1}(i,k) & r_{1,2}(i,k) & \ldots & r_{1,N}(i,k) \\ r_{2,1}(i,k) & r_{2,2}(i,k) & \ldots & r_{2,N}(i,k) \\ \vdots & \vdots & \ddots & \vdots \\ r_{N,1}(i,k) & r_{N,2}(i,k) & \ldots & r_{N,N}(i,k) \end{bmatrix},$$

where N is a number of antennas at the transmitter, i is a symbol index, and k is a subcarrier index, and wherein the receiving the channel covariance matrix R(i,k) comprises receiving upper triangle components $r_{x,y}(i,k)$ of R(i,k), where $x \leq y$, which are mapped on constellation points.

10. The method according to claim 9, wherein the constellation points are points of a 16 QAM (quadrature amplitude modulation) constellation.

11. The method according to claim 9, wherein the constellation points are points of a PSK (phase shift keying) constellation.

12. The method according to claim 9, wherein the mapping maps each pair of two diagonal components $r_{x,y}(i,k)$, where x=y, to one constellation point by using one of the two diagonal components as a real part of a complex value and the other one of the two diagonal components as an imaginary part of the complex value.

* * * * *